Patented June 9, 1942

2,285,458

UNITED STATES PATENT OFFICE 2,285,458

ADHESIVE MATERIAL

Emile Pragoff, Jr., Wilmington, Del., assignor to Hercules Powder Company, Wilmington, Del., a corporation of Delaware No Drawing. Application April 1, 1939, Serial No. 265,521

8 Claims. (Cl. 260—737)

This invention relates to adhesives and more particularly to adhesives of the rubber base type commonly used in the manufacture of adhesive tape.

Rubber base adhesives comprise principally a mixture of rubber and rosin and are characterized by being what is termed pressure-sensitive, i. e., they remain sticky under normal atmospheric conditions and can be made to adhere to a surface by pressure alone without using either heat or moisture. Although, as stated, the principal constituents of such adhesives are rosin and rubber, various modifications may be made in the properties of this composition in order to give to such a composition, for example, the proper body and desired adhesion for any particular purpose. One modification, for example, of the rosin-rubber combination is the product commonly known as zinc-oxide adhesive which consists of the rubber-rosin base to which, among other ingredients, zinc oxide has been added to act as a filler to produce an adhesive which is tough, strongly adherent and not stringy when touched.

All of these prior art adhesive compositions containing a rubber-rosin base have had a pronounced tendency to deteriorate upon aging under ordinary atmospheric conditions and lose their adhesive qualities. It is well known that ordinary rosin, one of the principal constituents of the type of adhesive referred to before, consists essentially of abietic acid, which is a complex organic acid having two double bonds. It is, therefore, an unsaturated body and tends to oxidize when exposed to atmospheric conditions. It has, of course, the same tendency when formulated in an adhesive composition; and when such an adhesive is exposed to the air, the rosin oxidizes and instead of having an ordinary unoxidized rosin present, a rosin oxidized to a degree dependent upon the length of exposure, will be present. As the rosin oxidizes, the original rubber-rosin base becomes a rubber-oxidized rosin base. Now even if a rosin is only partially oxidized, it forms with rubber a composition which is tougher and less sticky than a similar composition in which an unoxidized rosin is used, and the more that the rosin is oxidized the less it has the tendency to form an adhesive composition when compounded with rubber.

It is an object of my invention to provide a pressure-sensitive adhesive of the rosin-rubber type which will be resistant to the aging process, and which will substantially retain its original adhesive qualities after exposure to normal atmospheric conditions for prolonged periods of time.

The object of my invention is accomplished by using in place of the ordinary rosin, in a rosin-rubber mixture, compounds which are rich in dehydroabietic acid or compounds rich in an ester of dehydroabietic acid. Among these compounds, in addition to dehydroabietic acid itself or an ester thereof, are pseudopimaric acid and esters of pseudopimaric acid, heat treated rosins or esters of heat treated rosins, and rosins, rosin acids and esters of rosin acids in which the unsaturation has been decreased under conditions of reaction adapted to produce an intra- and inter-molecular rearrangement of hydrogen atoms, in accordance with the method more fully set forth below. All of these substances may be used alone, or they may be used in combination, or they may be used alone or in combination together with an additional material.

The heat treated rosin may, for example, be the so-called pyroabietic acid known to be rich in dehydroabietic acid or it may be any other heat treated rosin in which the major constituent is dehydroabietic acid. The pseudopimaric acid useful in the compositions of the present invention, may be prepared in accordance with the process disclosed in U. S. Patent No. 2,072,628. This material is also rich in dehydroabietic acid.

Rosins, rosin acids, and esters of rosin acids in which the unsaturation has been decreased under conditions of reaction adapted to produce an intra- and inter-molecular rearrangement of hydrogen atoms in these compounds may be prepared in accordance with the processes disclosed in a co-pending application of E. R. Littmann, Serial No. 6,403, filed February 13, 1935, refiled June 12, 1936, for a Process for the treatment of abietyl compounds and products produced thereby, and in U. S. Patent No. 2,130,997. The processes disclose, treating the abietyl compound with a catalyst in a manner adapted to exclude the possibility of reaction between the abietyl compound and any other material. As a result of such treatment there is a change in the chemical and physical properties of the compound being treated resulting from what is believed to be an intra- and inter-molecular rearrangement of the hydrogen atoms in the compound. The catalysts which may be used in effecting this intra- and inter-molecular rearrangement are those which catalyze hydrogenation of unsaturated compounds, e. g., any of the nickel, platinum, palladium, or copper chromite catalysts used in such hydrogenations. Hereinafter, I will refer to compounds made by this reaction as "Hyex" compounds and the reaction by which they are produced as the "Hyex reaction." When "Hyex" rosin, for example, is analyzed, it is found that the major constituent has the known physical constants of dehydroabietic acid as described in the literature.

Among the compounds which I have found suitable as plasticizing agents in conjunction with rubber for the preparation of superior adhesive compositions are dehydroabietic acid, dehydroabietic acid esters, so-called pyroabietic acid and esters thereof, pseudopimaric acid, and rosins, rosin acids and rosin esters which have undergone the "Hyex reaction" such as, for example, "Hyex" rosin, "Hyex" abietic acid, esters of "Hyex" abietic acid such as "Hyex" methyl and ethyl abietate and "Hyex" glycerol abietate.

Where, in the claims, I refer to compounds rich in dehydroabietic acid or an ester thereof, I mean that the major constituent of the compound is either dehydroabietic acid or an ester of dehydroabietic acid.

While I will now describe my invention particularly by reference to compounds made by the "Hyex reaction," it will be understood that I am not restricted solely to "Hyex" compounds in view of what I have stated above.

I have found that "Hyex" compounds, for example, are highly resistant to oxidation even when exposed to air or oxygen for prolonged periods, and that they may be compounded with rubber to serve as a plasticizer therefor in a manner similar to that when ordinary rosin is used. An adhesive mass is produced in this manner which has good tack and adhesion and which retains these properties even after prolonged exposure to oxidizing conditions.

With regard to the resistance to oxidation of "Hyex" rosin, for example, in comparison with ordinary rosin, tests were made by pulverizing samples of both and subjecting these at room temperature to pure oxygen in a bomb under a pressure of 30 pounds per square inch. At the end of six days, the untreated rosin showed an oxygen absorption of 4.55%, whereas the "Hyex" rosin showed an oxygen absorption of only 0.087%.

It will be understood that none of the substances used as plasticizing agents for rubber in my improved adhesive compositions needs to have all of the unsaturation removed. In the case of "Hyex" products, the unsaturation still remaining after the compounds have undergone the "Hyex" reaction, is conveniently measured by the thiocyanate value. I have found, for example, that a wood rosin having a thiocyanate value of 90–96 originally and after subjection to the "Hyex" reaction, having a thiocyanate value from 10–14, produced, when compounded with rubber, very satisfactory adhesive compositions highly resistant to deterioration on oxidation. In a similar manner a "Hyex" methyl abietate with a thiocyanate value of about 4, compared with about 94 on the untreated material, was very satisfactory for adhesive formulation.

The amount of plasticizing agent used in my compositions will be quite variable and will depend upon the particular qualities desired in the adhesive. In any case, however, the amount used should be such that the composition produced is plastic and sticky. In the case of a "Hyex" compound, for example, the content of the "Hyex" compound in the adhesive composition will not exceed the rubber content thereof and in most cases it will be desirable to have the rubber in predominant amount.

In practice the improved adhesive material may be made by first rolling the rubber on a suitable mill until it is smooth, and my plasticizing agent may then be added and the mixture worked to a homogeneous mass, after which fillers, waxes, etc., may be added and the mass further worked until these ingredients are uniformly dispersed. For particular purposes, it may also be desirable to have present a softener such as, for example, mineral oil. The adhesive mass prepared as shown may then be applied to cloth or paper by an ordinary calendering or spreading operation.

It will also be understood that instead of using "Hyex" rosin alone, for example, as the plasticizing agent, I may, if I so desire, use the "Hyex" rosin in conjunction with a small amount of the untreated rosin, although this product may not be as good as that in which only "Hyex" rosin is used, it will, nevertheless, be superior to one in which only unsaturated rosin has been used.

The following examples illustrate some specific adhesive compositions prepared in accordance with my invention.

Example I

Masking tape adhesives were prepared according to the formula given below, using ordinary rosin, and "Hyex" rosin. The formula is as follows:

| | Parts by weight |
|---|---|
| Crepe rubber | 100 |
| Rosin or "Hyex" rosin | 30 |
| Zinc oxide | 25 |
| Lithopone | 75 |

Cut with 66 parts by weight of benzol.

In preparing the formulations, the crepe rubber was placed in a suitable mill, and milled for a short while. The rosin or "Hyex" rosin, zinc oxide and lithopone were then added in the order stated, milling the mixture after each addition, before making the next addition, in order to obtain uniform distribution. After all of the ingredients had been incorporated, the mixture was cut with the quantity of benzol shown and again milled for a short time. The total milling time in the case of the ordinary rosin was one hour, but on the treated rosin was reduced to 30 minutes because results on the ordinary rosin-rubber combination indicated that a shorter time of milling is better.

In every case, a very tacky composition was produced and tapes were prepared therefrom by spreading a thin layer of each composition on kraft paper. Each tape was then aged for 30 days in air at room temperatures. At the end of this period, the adhesive composition prepared from ordinary rosin had no tack, in other words it had lost all of its adhesive characteristics. On the other hand, the adhesive composition prepared with "Hyex" rosin retained substantially all of its original tackiness after this aging period.

These results definitely indicate the better aging qualities of adhesives containing "Hyex" rosin.

Example II

Several masking tape adhesives were prepared according to the formulae shown below using ordinary rosin, "Hyex" resin acid and "Hyex" methyl abietate. These formulae in parts by weight are as follows:

| Material | 1 | 2 | 3 | 4 |
|---|---|---|---|---|
| Crepe rubber | 100 | 100 | 100 | 100 |
| I wood rosin | | | | 30 |
| Methyl abietate (untreated) | | 30 | | |
| "Hyex" methyl abietate (thiocyanate No. 16) | 30 | | | |
| "Hyex" resin acid (thiocyanate No. 18) | | | 30 | |
| Zinc oxide | 25 | 25 | 25 | 25 |
| Lithopone | 75 | 75 | 75 | 75 |
| Benzol | 70 | 60 | 80 | 80 |

In preparing these compositions, the crepe rubber was first placed on the mill and milled for 10 minutes. The rosin, or the other treated rosin derivatives were then added and the milling continued for 7 minutes in order to obtain a uniform blend. The zinc oxide and lithopone were then added in the order shown, in each case milling for 5 minutes after each addition. After all the ingredients had been incorporated, the mixture was cut with the quantity of benzol shown and milled for an additional 3 minutes. The total milling time was thus 30 minutes.

In all cases the milling was satisfactory and all of the adhesives thus made had the desired tack. Tapes were prepared from each of these compositions by spreading a thin layer on kraft paper. Each tape was then exposed to the ultraviolet arc for 24 hours at the end of which time the composition with I wood rosin was badly discolored and had practically completely lost its surface tack, whereas the other samples retained both color and tack. After exposing other pieces of tape to 25 days aging under normal room conditions, the tack retention of the adhesives containing the "Hyex" compounds was markedly superior to those containing the untreated compounds. Aging under such conditions is, of course, an accelerated test, but it nevertheless shows the remarkable superiority of the "Hyex" compounds and is an indication of the behavior of adhesive compositions containing these compounds when aged under less drastic conditions, such as, for example, in an adhesive roll. For all practical purposes, the adhesive compositions containing the "Hyex" compounds retain their adhesive qualities permanently which certainly cannot be said for those made with ordinary rosin or ordinary methyl abietate.

My adhesive compositions containing essentially a base composed of rubber and compounds rich in dehydroabietic acid or rich in esters of dehydroabietic acid, having aging characteristics superior to prior art compositions in which rosin has been used in conjunction with rubber, because of the resistance to oxidation of these substances. My improved adhesive compositions not only retain their tack and adhesion, but, likewise, retain their firmness, which has not been the case heretofore and has caused considerable difficulty.

It will be understood that where reference is made herein to a rosin acid, a carboxylic acid found in rosin and containing the group $C_{19}H_{29}$, is meant, the best known of these acids being abietic, sapinic, and d-pimaric acids. The relative proportions in which these and other isomeric rosin acids will appear in a given sample of rosin will depend primarily upon the source of the rosin.

It will be further understood that the details and examples given hereinbefore are illustrative only and in no way limiting on my invention as broadly described hereinbefore and in the appended claims.

What I claim and desire to protect by Letters Patent is:

1. An age-resistant pressure-sensitive adhesive composition essentially comprising rubber and between about 20 and about 30 per cent by weight thereof of a material selected from the group consisting of rosins, rosin acids, and rosin acid esters, which have undergone inter- and intra-molecular rearrangement in such manner that their ethylenic unsaturation has been reduced, said rearrangement having been effected by treatment of the material with a hydrogenation catalyst in the absence of added substances capable of reducing the degree of unsaturation.

2. An age-resistant pressure-sensitive adhesive composition essentially comprising rubber and between about 20 and about 30 per cent by weight thereof of rosin which has undergone inter- and intra-molecular rearrangement in such manner that its ethylenic unsaturation has been reduced, said rearrangement having been effected by treating the rosin with a hydrogenation catalyst in the absence of added substances capable of reducing the degree of unsaturation.

3. An age-resistant pressure-sensitive adhesive composition essentially comprising rubber, a small proportion of rosin, and between about 20 and about 30 per cent by weight of the rubber of rosin which has undergone inter- and intra-molecular rearrangement in such manner that its ethylenic unsaturation has been reduced, said rearrangement having been effected by treating the rosin with a hydrogenation catalyst in the absence of added substances capable of reducing the degree of unsaturation.

4. An age-resistant pressure-sensitive adhesive composition comprising rubber, a filling material, and between about 20 and about 30 per cent by weight of the rubber of rosin which has undergone inter- and intra-molecular rearrangement in such manner that its ethylenic unsaturation has been reduced, said rearrangement having been effected by treating the rosin with a hydrogenation catalyst in the absence of added substances capable of reducing the degree of unsaturation.

5. An age-resistant pressure-sensitive adhesive composition essentially comprising rubber and between about 20 and about 30 per cent by weight thereof of dehydroabietic acid.

6. An age-resistant pressure-sensitive adhesive composition essentially comprising rubber and between about 20 and about 30 per cent by weight of an ester of a rosin acid which has undergone inter- and intra-molecular rearrangement in such manner that its ethylenic unsaturation has been reduced, said rearrangement having been effected by treatment of the material with a hydrogenation catalyst in the absence of added substances capable of reducing the degree of unsaturation.

7. An age-resistant pressure-sensitive adhesive composition essentially comprising rubber and between about 20 and about 30 per cent by weight of a monohydric alcohol ester of a rosin acid which has undergone inter- and intra-molecular rearrangement in such manner that its ethylenic unsaturation has been reduced, said rearrangement having been effected by treatment of the material with a hydrogenation catalyst in the absence of added substances capable of reducing the degree of unsaturation.

8. An age-resistant pressure-sensitive adhesive composition essentially comprising rubber and between about 20 and about 30 per cent by weight thereof of the methyl ester of dehydroabietic acid.

EMILE PRAGOFF, Jr.